(12) United States Patent  (10) Patent No.: US 7,959,420 B1
Sperry  (45) Date of Patent: Jun. 14, 2011

(54) CONSTANT TORQUE UNLOADER SYSTEM FOR A COMPRESSOR

(75) Inventor: Lauren D. Sperry, Lake Winnebago, MO (US)

(73) Assignee: ACI Services, Inc., Cambridge, OH (US)

( * ) Notice: Subject to any disclaimer, the term of this patent is extended or adjusted under 35 U.S.C. 154(b) by 854 days.

(21) Appl. No.: 11/861,702

(22) Filed: Sep. 26, 2007

Related U.S. Application Data (60) Provisional application No. 60/847,233, filed on Sep. 26, 2006.

(51) Int. Cl.
*F04B 49/00* (2006.01)
*F16K 15/18* (2006.01)
(52) U.S. Cl. ............... 417/440; 417/446; 137/512.1
(58) Field of Classification Search .......... 417/296, 417/306, 441, 446, 440; 137/523, 512.1
See application file for complete search history.

(56) References Cited

U.S. PATENT DOCUMENTS

| 4,043,710 | A | * | 8/1977 | Bunn et al. | 417/440 |
| 4,445,824 | A | * | 5/1984 | Bunn et al. | 417/440 |
| 4,447,193 | A | * | 5/1984 | Bunn et al. | 417/441 |
| 4,737,080 | A | * | 4/1988 | Owsley et al. | 417/275 |
| 5,331,998 | A | * | 7/1994 | Sperry | 137/512.1 |
| 5,695,325 | A | * | 12/1997 | Sperry | 417/53 |
| 6,361,288 | B1 | * | 3/2002 | Sperry | 417/307 |

* cited by examiner

*Primary Examiner* — Devon C Kramer
*Assistant Examiner* — Nathan Zollinger
(74) *Attorney, Agent, or Firm* — Erickson, Kernell, Derusseau & Kleypas, LLC.

(57) ABSTRACT

An unloader system for a reciprocating gas compressor includes an unloader valve assembly which may be installed as the suction valve assembly or the discharge valve assembly of the compressor. The valve assembly includes a valve seat having one or more seat passages formed therethrough and a valve guard having a number of valve members movably mounted thereon equal to the number of seat passages. One of the valve guard and valve seat is rotatable relative to the other. The rotatable member is driven by a constant torque motor or other power source which stalls when a retarding force caused by pressure differentials across the valve members overcomes the torque supplied. Once pressures across the valve members equalize, the rotatable member can resume rotation. A method of unloading a compressor using the unloader system includes selecting a rotational speed for the rotating member to allow backflow.

21 Claims, 8 Drawing Sheets

CONSTANT TORQUE UNLOADER SYSTEM FOR A COMPRESSOR

This application claims the benefit of provisional application Ser. No. 60/847,233 filed Sep. 26, 2006.

BACKGROUND OF THE INVENTION

1. Field of the Invention

This invention relates to unloaders for reciprocating gas compressors, and in particular to an unloader having a valve assembly with a valve guard and valve seat mounted for relative rotation. The rotatable member is driven by a constant torque motor or other power source which stalls or slips when the torque supplied is overcome by forces on the valve assembly caused by pressure differentials across the valve. Once pressures equalize, the rotatable member is free to resume rotation.

2. Description of the Related Art

In my earlier patent, U.S. Pat. No. 5,695,325, entitled Synchronized Unloader System and Method for a Gas Compressor, I disclosed an unloader system for a reciprocating gas compressor which includes an unloader valve assembly having a valve seat with multiple seat passages extending therethrough and arranged in a seat passage circle. A valve guard is rotatably mounted on the valve seat and includes a plurality of valve members arrayed in a valve circle and movable between open and closed positions with respect to the seat passages. An unloader actuation system includes a controller connected to a control system for the compressor and a stepper motor drivingly connected to the valve guard. In use, the valve guard is incrementally rotated in synchronization with the compressor crankshaft by increments corresponding to the spacing between the valve members and the seat passages. The closings of the valve members are delayed by varying amounts to achieve varying amounts of unloading.

SUMMARY OF THE INVENTION

The present invention is an unloader system which utilizes a valve assembly similar to those described in U.S. Pat. No. 5,695,325. Instead of being synchronized with the compressor crankshaft by means of a stepper motor and electronic control system, however, the valve guard is rotatably driven by a power source having a constant or steady torque and the ability to stall or slip when the resistance on the valve guard exceeds the torque supplied by the power source. As the valve guard rotates, the valve members will periodically come into alignment with the valve seat passages. When the pressure acting on the valve member is sufficient to resist the torque of the power source, the power source will slip, causing a delay in the rotation of the valve guard. When the pressure equalizes across the valve member, the guard will resume rotation. The speed of rotation of the valve guard may be selected to cause the valve members to next align themselves with the valve seat passages at a point in the compressor cycle wherein some amount of gas is allowed to flow backward before the valve member can close, thereby partially unloading the compressor. The amount of backflow can be adjusted by adjusting the speed of rotation of the guard. Unloading is achieved by decreasing capacity by intentionally allowing either late closure of a suction valve or a discharge valve.

In addition to unloading, the use of rotational valves, such as the valve of the present invention also improves efficiency of the compressor. Many compressors now have up to 30% of the compressor horsepower that results from just the resistance to flow through the valves at the velocities required. Efficiently operating reciprocating compressors may have as little as 5%-7% of the horsepower used to overcome the resistance to flow through the valve. The majority of the horsepower in both cases goes to getting the gas from the lower pressure to the higher pressure.

One factor in the operation of the unloader of the present invention is that efficiency is improved as the sealing element is out of the gas stream during a significant part of the intake or exhaust stroke. In some cases, it would be possible to show an improvement of as much as 15% to 20% in the operating efficiency of a compressor if any or all valves in the compressor were equipped to allow this reduced resistance to flow. This would be referred to as "active valves" as they would have an operating mechanism, and would not be dependent strictly on a pressure differential to open the valves as is the case with conventional valves.

BRIEF DESCRIPTION OF THE DRAWINGS

FIG. 3(a) is a view similar to FIG. 3 showing an alternative embodiment of the unloader system having a rotatable guard mounted in a stationary carrier.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
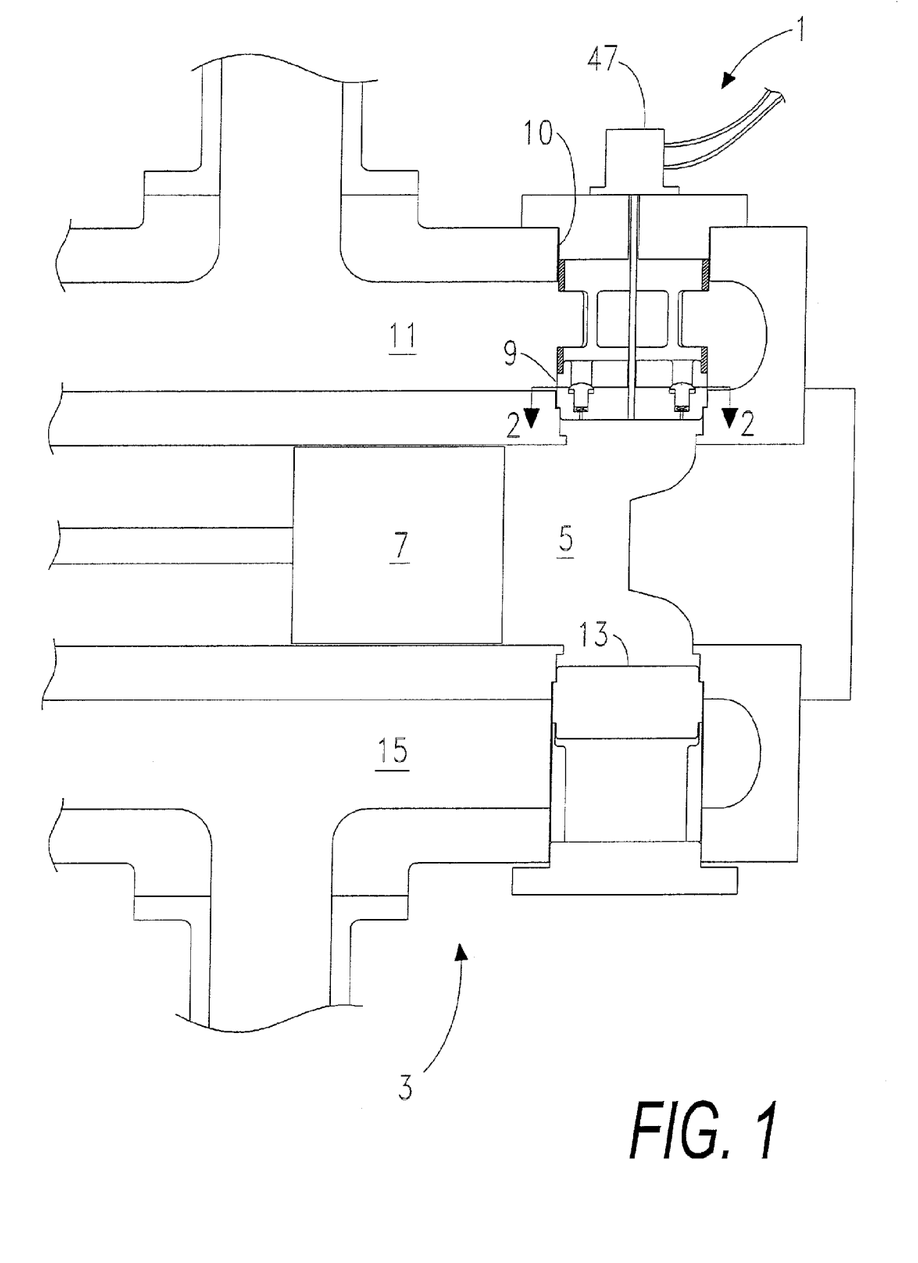
FIG. 1 is a fragmentary cross sectional view of a reciprocating gas compressor showing a constant torque unloader system according to the present invention operating as a suction valve of the compressor.

Referring to the drawings in more detail, and in particular to FIG. 1, the reference number 1 generally designates a constant torque unloader system according to the present invention. The system 1 is for use on a reciprocating compressor 3 including a cylinder 5 slidably receiving a piston 7 connected to a crankshaft (not shown). A suction valve assembly 9 mounted in a suction of the compressor 3 selectively communicates the cylinder 5 with a suction line 11. Similarly, a discharge valve assembly 13 selectively communicates the cylinder 5 with a discharge line 15. The compressor 3 generally operates to moves gas from the suction line 11 to the discharge line 15 at increased pressure.

Figure 7:
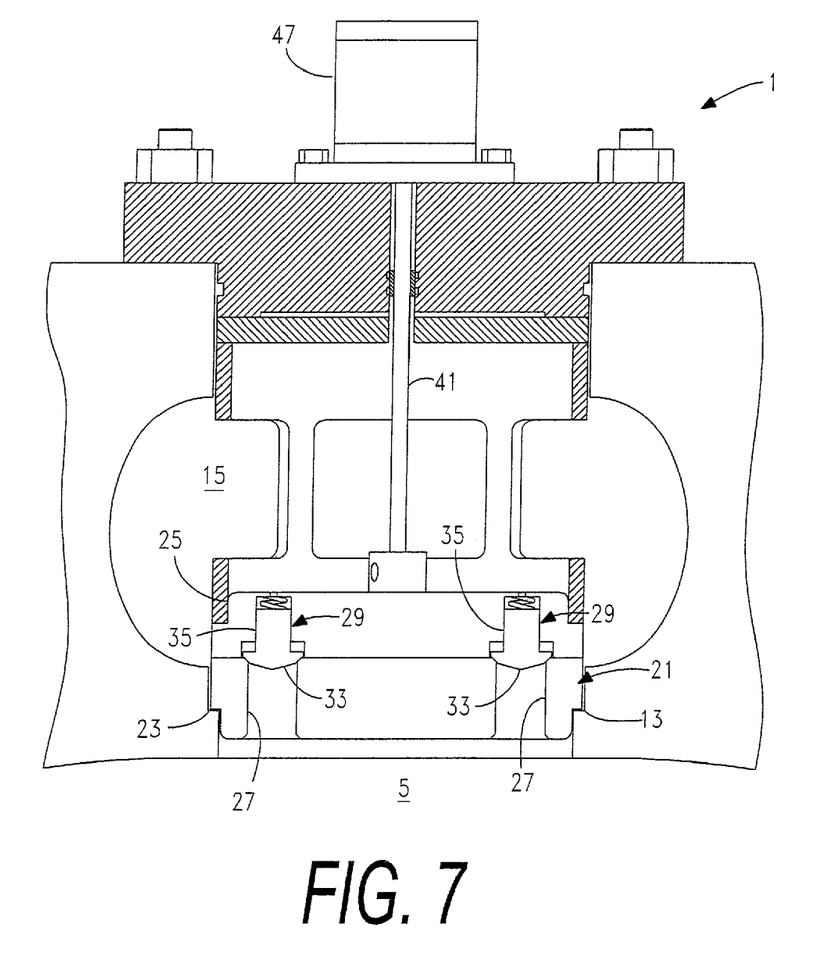
FIG. 7 is a cross sectional view similar to FIG. 3 and showing the unloader system operating as a discharge valve.

The system 1 includes a valve assembly 21 which may be installed in the compressor 3 to act as either a suction valve assembly 9 (as shown in FIGS. 1-5) or as a discharge valve assembly 13 (as shown in FIG. 7). For purposes of simplicity, the valve assembly 21 will primarily be described and depicted herein as a single deck suction valve assembly 9 selectively controlling communication between the cylinder 5 and suction line 11 of the compressor 3. It is to be understood, however, that the current invention may be equally well applied to radial valve assemblies and multi-deck valve assemblies, which may be either suction valve assemblies 9 or discharge valve assemblies 13. These other types of valve assemblies 21 are generally described in U.S. Pat. No. 5,695,325, the disclosure of which is hereby incorporated by reference.

Figure 2:
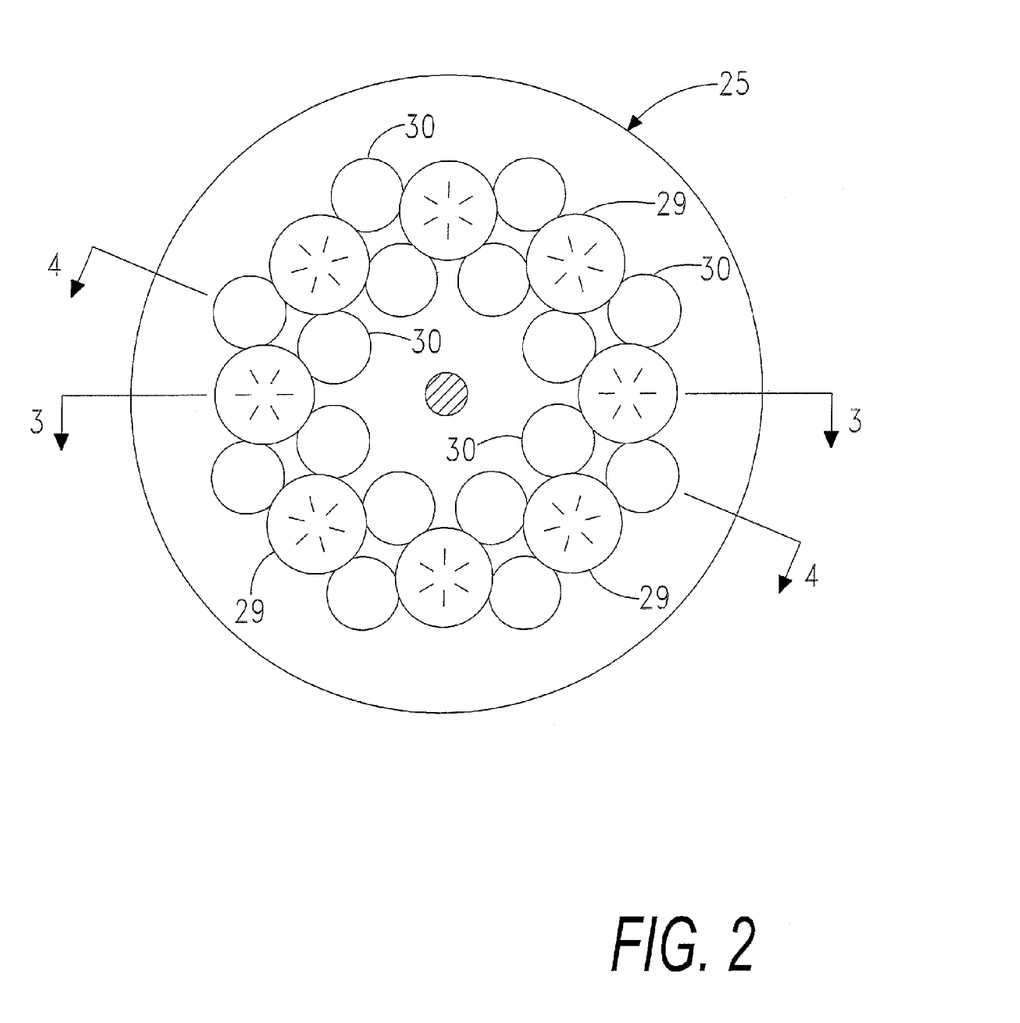
FIG. 2 is a cross section of an unloader valve which forms a part of the unloader system taken along line 2-2 in FIG. 1 and showing a valve guard thereof.
Figure 3:
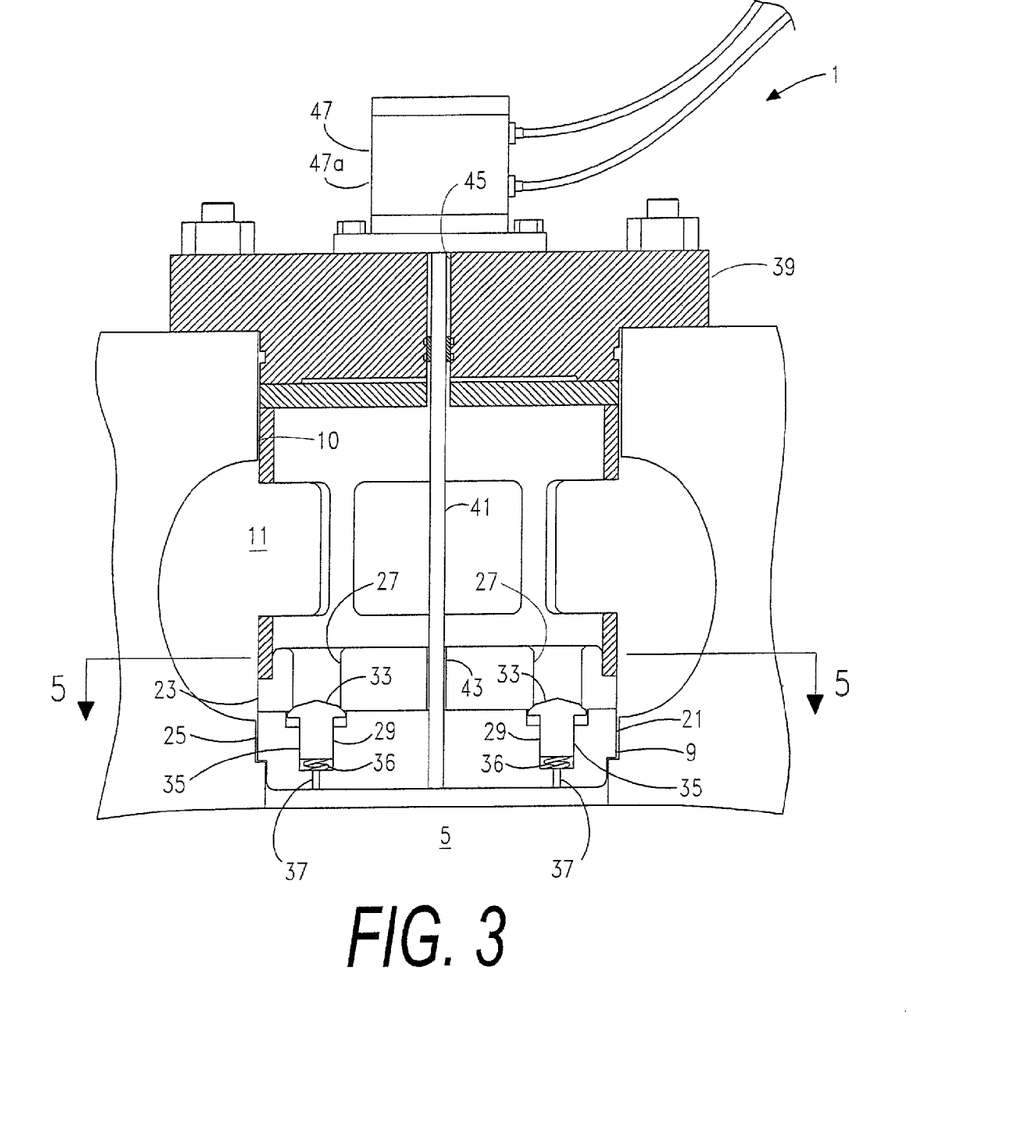
FIG. 3 is a cross section of the unloader system taken along line 3-3 in FIG. 2 and showing valve members mounted on the valve guard in an aligned orientation with valve seat openings in a valve seat.
Figure 4:
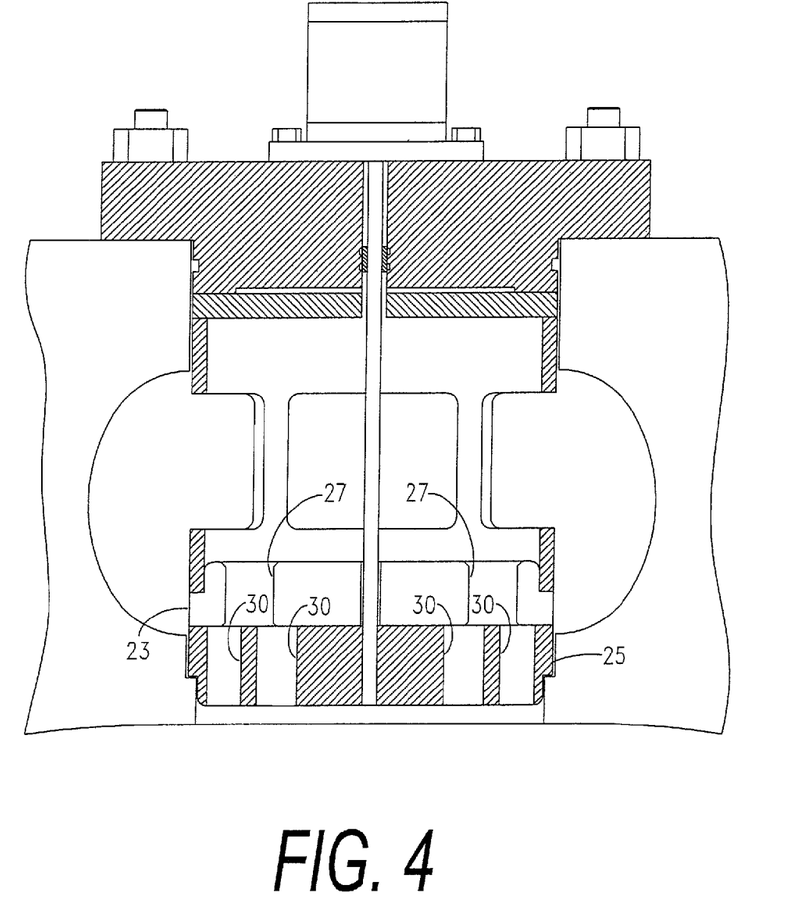
FIG. 4 is a cross section of the unloader system taken along line 4-4 in FIG. 2 and showing the valve guard in an orientation wherein the valve members are not aligned with the valve seat openings.

Referring to FIGS. 2-5, the valve assembly 21 includes a valve seat 23 and a valve guard 25 rotatably mounted on the valve seat 23. The valve seat 23 includes one or more valve seat passages 27 extending therethrough. The valve guard 25 includes one or more valve members 29 movable between open and closed positions with respect to the valve seat passages 27 when the valve guard 25 rotated relative to the valve seat 23 such that the valve members 29 are in alignment with the valve seat passages 27. The valve guard 25 further includes a plurality of bypass openings 30 around the valve members 29. As the valve guard 25 rotates on the valve seat 23, the valve members 29 move cyclically in and out of alignment with the valve seat passages 27. When the valve members 29 are aligned with the valve seat passages 27 (as shown in FIG. 3) the valve seat 23 the valve members 29 control flow through the valve assembly 21. When the valve members 29 are out of alignment with the valve seat passages 27 (as shown in FIG. 4), gas flows freely through the valve assembly 21 by way of valve seat passages 27 communicating with the bypass openings 30.

Figure 5:
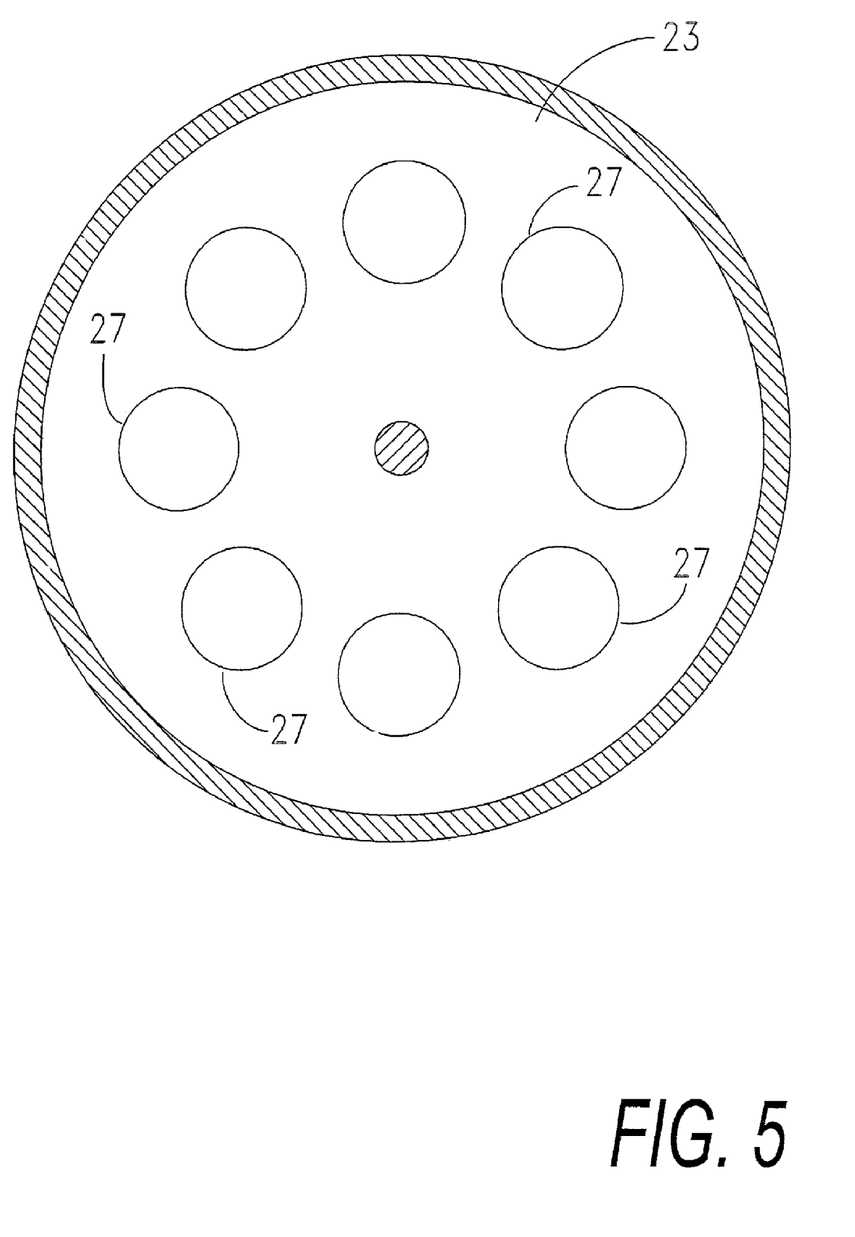
FIG. 5 is a cross section of the unloader system taken along line 5-5 in FIG. 3 and showing the valve seat thereof.

An exemplary valve guard 25 is shown in FIG. 2 as having eight poppet type valve members 29 arranged in a circle and equally spaced apart (at 45 degree increments). A compatible valve seat 23 is shown in FIG. 5 as having eight valve seat passages also arranged in a circle and equally spaced apart (at 45 degree increments). As best seen in FIG. 3, each poppet valve member 29 has a head 33, a stem 35 and urged against the valve seat 23 by a valve spring 36. It is to be understood, however, that the number of valve seat passages 27 and valve members 29 may be more or less than the eight shown and that they may be arranged in several concentric circles. Furthermore, it is to be understood that other known types of valve members 29 may be used in place of the poppet type valve members 29 shown.

Referring again to FIG. 3, the valve assembly 21 is mounted in a suction valve pocket 10 of the compressor 3 such that, when the valve members 29 are aligned with their respective seat passages 27, pressure in the suction line 11 acts on the heads 33 of the valve members 29 and urges them toward their open positions. After Bottom Dead Center (BDC), pressure in the cylinder 5 acts on the stems 35 of the valve members 29 through openings 37 in the valve guard 25 and urges the valve members 29 toward their closed positions. When the pressure in the cylinder 5 is less than the pressure in the suction line 11, the valve members 29 move into their open positions. When the pressure in the cylinder 5 is greater than the pressure in the suction line 11, the valve members 29 move into their closed positions.

A cap 39 covers the suction pocket 10 and retains the valve assembly 21 in position. A first end of an unloader drive shaft 41 is fixedly connected to the valve guard 25 in axial relation to the circle of valve members 29. The shaft 41 extends through a shaft receiver 43 in the valve seat 23 and is rotatable relative thereto. A second end of the unloader drive shaft 41 extends outwardly from the suction pocket 10 through an opening 45 in the cap 39.

A constant torque power source 47 is operatively connected to the second end 42 of the unloader valve drive shaft 41 and is operable to rotate the valve guard 25 relative to the valve seat 27. As shown in FIG. 3, the constant torque power source 47 may be, for example a motor 47a, such as a pneumatic, hydraulic or electric motor (such as a direct current electric motor) having the ability to slip or stall when the resistance to rotation exceeds the torque being produced. The rotational speed of the power source 47 is preferably adjustable, such as through variation in the current or fluid flow supplied to the motor 47a, so that the amount of unloading may be varied as discussed below.

FIG. 3(a) shows an alternative embodiment 1a of the present invention wherein the valve guard 25 is mounted in a stationary carrier 26 having a cylindrical recess sized to rotatably receive the valve guard 25. As with the previous embodiment, the guard 25 is fixed to the shaft 41 and carries the moveable valve members 29. The carrier 26 is fixedly clamped between the valve seat 23 and a lower shoulder of the valve pocket 10. Mounting the guard 25 in a separate carrier 26 allows for easier rotation of the guard 25 relative to the valve seat 23. The operation of the system 1a is identical to the operation of the system 1 as described below.

Figure 6:
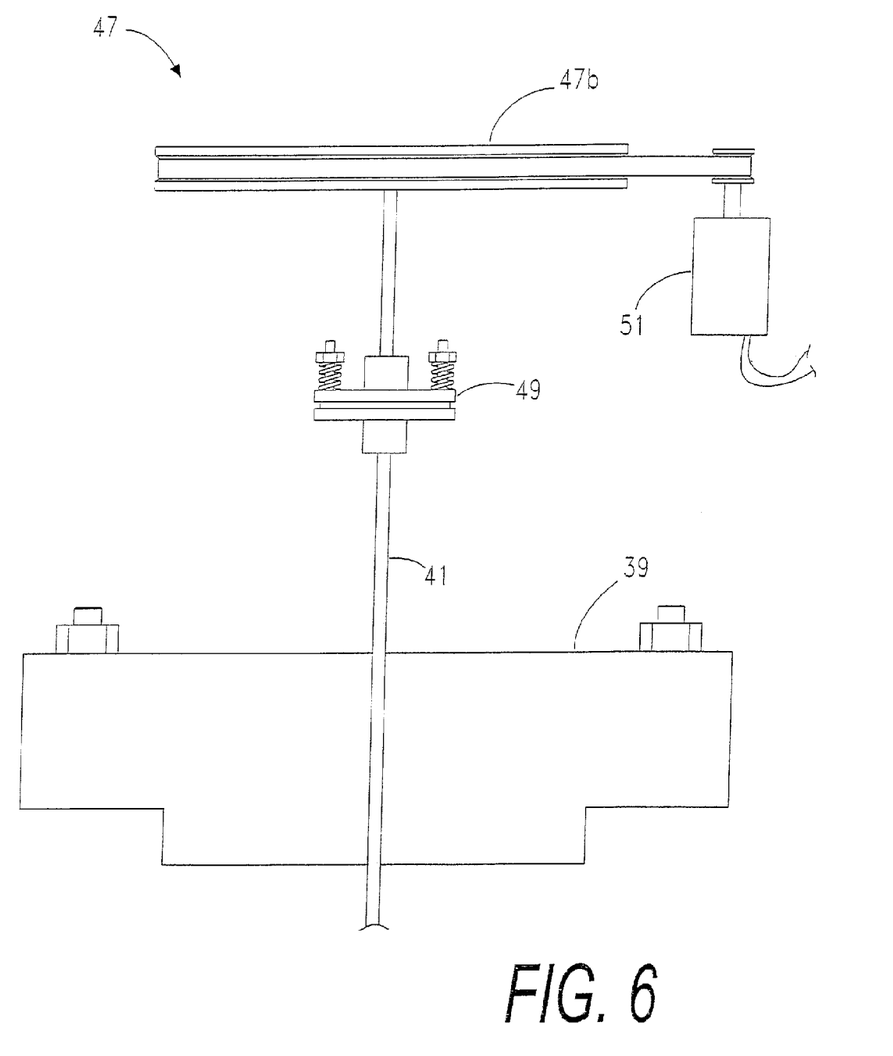
FIG. 6 is a partially schematic fragmentary view of the unloader system showing an alternative embodiment of the constant torque power source for the unloader system.

As shown in FIG. 6, the constant torque power source 47 may also be a flywheel 47b acting on the unloader valve drive shaft 41 through a slip clutch 49. The flywheel 47b may be, for example, driven by a motor 51. In this embodiment, the slip clutch 49 may be adjusted to vary the torque transmitted to the valve guard 25. The slip clutch 49 will begin to slip, pausing rotation of the valve guard 25 when the set torque limits of the clutch are overcome by forces on the valve assembly 21 caused by pressure differentials across the valve members 29. The flywheel 47b will continue to rotate. It should be noted that FIG. 6, which is partially schematic, shows the motor 51 acting on the flywheel 47b through a simple belt and sheave arrangement, however it is to be understood that the flywheel could also be driven using any known drive system, including a gear drive, and that any drive system used would incorporate sufficient reduction to allow the flywheel 47b to rotate the valve guard 25 at the proper rotational speed for the compressor.

Operating Example

The operation of the system 1 may be shown by assuming a 320 RPM Compressor operating with 50% Suction Volumetric Efficiency ("VE") and looking at a cycle of the compressor 5 starting with the piston 7 at top dead center ("TDC")

and the valve members 29 in their closed position sealing the valve seat passages 27. As described above, the valve assembly 21 of the system 1 is a suction valve assembly 9 having eight valve members 29 equally space apart (at 45 degree intervals) around a circle. A constant torque is applied on the suction unloader drive shaft 41 by the power source 47. The valve guard 25 does not move initially since at TDC the cylinder pressure pushes the valve members 29 against the valve seat 23 with sufficient force to resist the torque supplied by the power source 47. However, when the pressure equalizes across the suction valve assembly 9 (at mid-stroke with a 50% suction VE), the valve guard 25 will start to rotate (after being delayed for one quarter revolution of the compressor crankshaft 8). If the valve guard 25 is rotated at one half of the speed of the compressor crankshaft, the valve members 29 will line up with the valve seat passages 27 at the same time that the piston 7 hits bottom dead center ("BDC"). If the pressure rise in the cylinder 5 is fast enough, the valve members 29 will not be able to move out of the valve seat passages 27 and compression will start. Because the valve members 29 close virtually simultaneously with the piston 7 reaching BDC, there is little or no backflow from the cylinder 5 to the suction line 11 and therefore the compressor 3 is operating in a fully loaded condition.

In order to partially unload the compressor 3, the rotational speed at which the unloader drive shaft 41 is driven by the power source 47 would be reduced. This would cause the valve guard 25 to arrive at the point where the valve members 29 realign themselves with the valve seat passages 27 at some point after BDC. This would allow some backflow from the cylinder 5 into the suction line 11 until the valve members 29 realign themselves with the valve seat passages 27 and are seated. To reduce the load even more, the speed of the unloader drive shaft 41 would be reduced even more.

If the valve assembly 21 is installed as a discharge valve assembly 13 (as shown in FIG. 7), the operation of the system 1 is essentially the same except that the valve members 29 are installed such that pressure in the cylinder 5 acts on the heads 33 of the valve members 29 urging them toward their open positions and pressure in the discharge line 15 acts on the stems 35 of the valve members 29 urging them toward their closed positions. As the valve guard 25 rotates on the valve seat 23, the valve members 29 periodically align with valve seat passages 27. If the pressure in the discharge line 15 pushes the valve members 29 closed with sufficient force to overcome the torque of the power source 47, the valve guard 25 will cease to rotate until pressure across the valve members 29 equalizes. Once the pressure equalizes, the valve guard 25 is free to resume rotation. As before, the degree of unloading is changed by adjusting the speed of rotation of the valve guard 25. By slowing the speed of rotation of the valve guard 25, the valve members 29 can be made to not align with the valve seat passages 27 again until some point after the piston 7 reaches top dead center, thereby delaying closing of the discharge valve members 29. This will allow some gas to flow back from the discharge line 15 into the cylinder 5, thereby delayed opening of the suction valve members, resulting in less gas coming into the cylinder during the suction event and partially unloading the compressor.

It is to be understood that while certain forms of the present invention have been illustrated and described herein, it is not to be limited to the specific forms or arrangement of parts described and shown. For example, the valve assembly 21 has been described as having a valve guard 25 rotatably mounted on a stationary valve seat 23, however it is foreseen that the valve guard 25 could be held stationary and the valve seat 23 rotated to produce the same result.

What is claimed and desired to be secured by Letters Patent is as follows:

1. An unloader system for a reciprocating compressor including a cylinder, a piston reciprocally mounted in the cylinder, a suction line selectively communicable with said cylinder through a suction valve assembly and a discharge line selectively communicable with said cylinder through a discharge valve assembly, said unloader system comprising:
   a) an unloader valve assembly acting as either the suction valve assembly or the discharge valve assembly of the compressor, said unloader valve assembly including:
      i) a valve guard and a valve seat, one of said valve guard and said valve seat being a rotatable member mounted for rotation relative to the other of said valve guard and said valve seat about an axis;
      ii) a valve seat passage extending through said valve seat and radially spaced from said axis, and
      iii) a valve member moveably mounted on said valve guard and positioned such that as said rotatable member rotates relative to said other of said valve guard and said valve seat, said valve member periodically comes into alignment with said valve seat passage; wherein
      iv) when said valve member is aligned with said valve seat passage pressure acts on said valve member to urge said valve member into a closed position against said valve seat and creates a retarding force resisting rotation of said valve guard; and
   b) means for applying a constant torque to said rotatable member during operation of the unloader system to rotate said rotatable member about said axis, said means allowing the rotation to stall if said retarding force overcomes said torque.

2. The unloader system as in claim 1 wherein said means for applying constant torque comprises a pneumatic motor.

3. The unloader system as in claim 1 wherein said means for applying constant torque comprises a hydraulic motor.

4. The unloader system as in claim 1 wherein said means for applying constant torque comprises an electric motor.

5. The unloader system as in claim 4 wherein said electric motor is a direct current electric motor.

6. The unloader system as in claim 1 wherein said means for applying constant torque includes a rotating flywheel.

7. The unloader system as in claim 1 wherein said means for applying constant torque includes a slip clutch.

8. The unloader system as in claim 1 wherein the rotational speed of said means for applying constant torque is selectively adjustable.

9. The unloader system as in claim 1 wherein said valve seat is stationary and said valve guard is mounted for rotation relative to said valve seat.

10. The unloader system as in claim 1 wherein said valve seat passage is one of a plurality of said valve seat passages and said valve member is one of a plurality of said valve members, the number of valve members being equal to the number of valve seat passages.

11. The unloader system as in claim 10 wherein said valve seat passages are arranged in a circle around said axis.

12. The unloader system as in claim 11 wherein said valve seat passages are axially oriented.

13. The unloader system as in claim 11 wherein said valve seat passages are radially oriented.

14. An unloader system for a reciprocating compressor including a cylinder, a piston reciprocally mounted in the cylinder, a suction line selectively communicable with said cylinder through a suction valve assembly and a discharge line selectively communicable with said cylinder through a discharge valve assembly, said unloader system comprising:
  a) an unloader valve assembly acting as the suction valve assembly of the compressor, said unloader valve assembly including:
    i) a valve seat;
    ii) a valve guard rotatably mounted on said valve seat for rotation about a valve guard axis;
    iii) a valve seat passage extending through said valve seat and radially spaced from said valve guard axis, and
    iv) a valve member moveably mounted on said valve guard and positioned such that as said valve guard rotates relative to said valve seat said valve member periodically comes into alignment with said valve seat passage, wherein
    v) when said valve member is aligned with said valve seat passage pressure in the cylinder can act on said valve member to urge said valve member into a closed position against said valve seat and create a retarding force resisting rotation of said valve guard; and
  b) a power source operably connected to said valve guard and acting to provide a constant torque to said valve guard during operation of the unloader system to rotate said valve guard relative to said valve seat about said valve seat axis, said power source allowing the rotation of said valve guard to stall if said retarding force overcomes said constant torque.

15. The unloader system as in claim 14 wherein said constant torque power source comprises a pneumatic motor.

16. The unloader system as in claim 14 wherein said constant torque power source comprises a hydraulic motor.

17. The unloader system as in claim 14 wherein said constant torque power source comprises an electric motor.

18. The unloader system as in claim 14 wherein said electric motor is a direct current electric motor.

19. The unloader system as in claim 14 wherein said constant torque power source includes a rotating flywheel.

20. The unloader system as in claim 14 wherein said constant torque power source includes a slip clutch.

21. The unloader system as in claim 14 wherein the rotational speed of said constant torque power source is selectively adjustable.

* * * * *